C. B. DALZELL.
PUMP.
APPLICATION FILED JUNE 30, 1913.

1,125,483.

Patented Jan. 19, 1915.
3 SHEETS—SHEET 1.

Witnesses.

Charles Brown Dalzell Inventor.
by Wilhelm Parker & Hard
Attorneys.

C. B. DALZELL.
PUMP.
APPLICATION FILED JUNE 30, 1913.
1,125,483.
Patented Jan. 19, 1915.
3 SHEETS—SHEET 2.
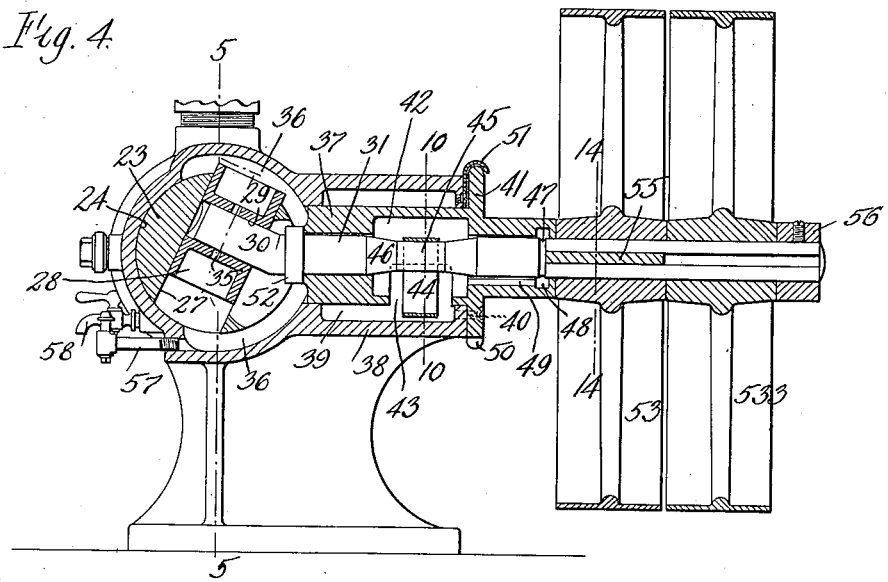
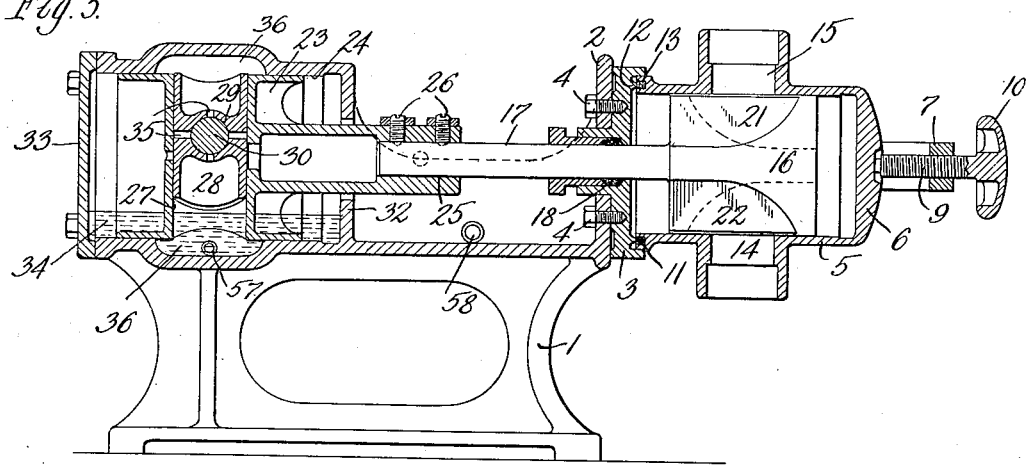
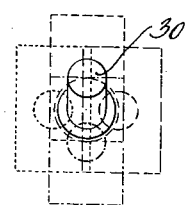
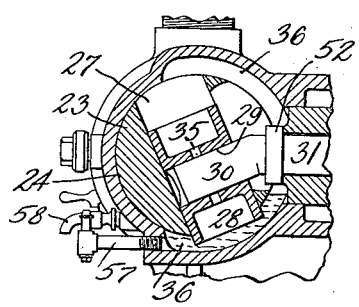
Witnesses.
A. G. Dimond
H. F. Robertson
Inventor.
Charles Brown Dalzell
by Wilhelm, Parker & Hard
Attorneys.

C. B. DALZELL.
PUMP.
APPLICATION FILED JUNE 30, 1913.
1,125,483.
Patented Jan. 19, 1915.
3 SHEETS—SHEET 3.
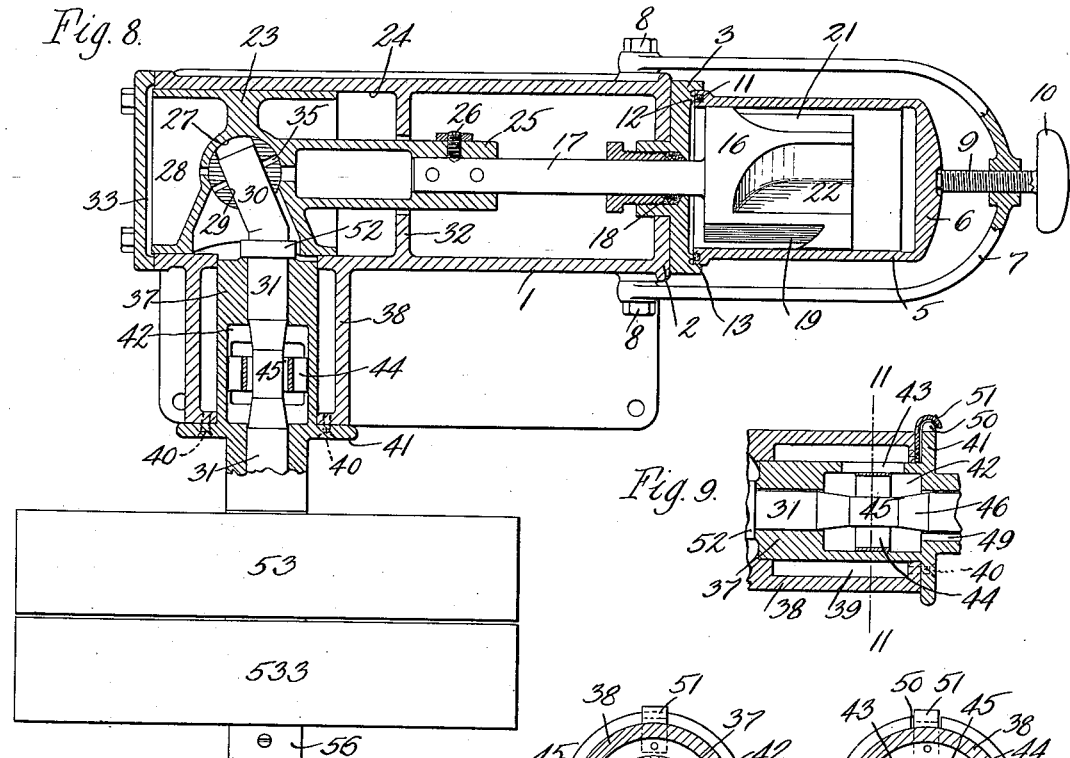
Witnesses
A. G. Dimond
A. T. Robertson
Inventor
Charles Brown Dalzell
by Wilhelm, Parker & Hard
Attorneys

UNITED STATES PATENT OFFICE.

CHARLES BROWN DALZELL, OF LITTLE FALLS, NEW YORK, ASSIGNOR TO D. H. BURRELL & COMPANY, OF LITTLE FALLS, NEW YORK.

PUMP.

1,125,483. Specification of Letters Patent. Patented Jan. 19, 1915.

Application filed June 30, 1913. Serial No. 776,506.

*To all whom it may concern:*

Be it known that I, CHARLES BROWN DALZELL, a citizen of the United States, residing at Little Falls, in the county of Herkimer and State of New York, have invented a new and useful Improvement in Pumps, of which the following is a specification.

This invention relates to a mechanically driven pump in which the piston has both a reciprocating and partial rotary movement and is so constructed that it acts as a valve as well as a piston. Pumps of this character are commonly known as "valveless" pumps and are particularly suitable for handling milk or other liquids of such nature as to render it necessary or desirable to frequently clean the pump. Owing to the fact that there are no valves, the pump may be very readily taken apart and thoroughly cleansed.

The objects of this invention are to provide an improved and simplified cylinder construction for a pump of this nature in which one cylinder head is made integral with the body of the cylinder, to provide an improved mechanism for imparting the necessary reciprocating and rotary movements to the piston, to provide improved lubrication for, and simplify the construction of the driving means for the piston, and otherwise to improve the general construction of the pump, as will appear from the following detailed description.

Figure 1:
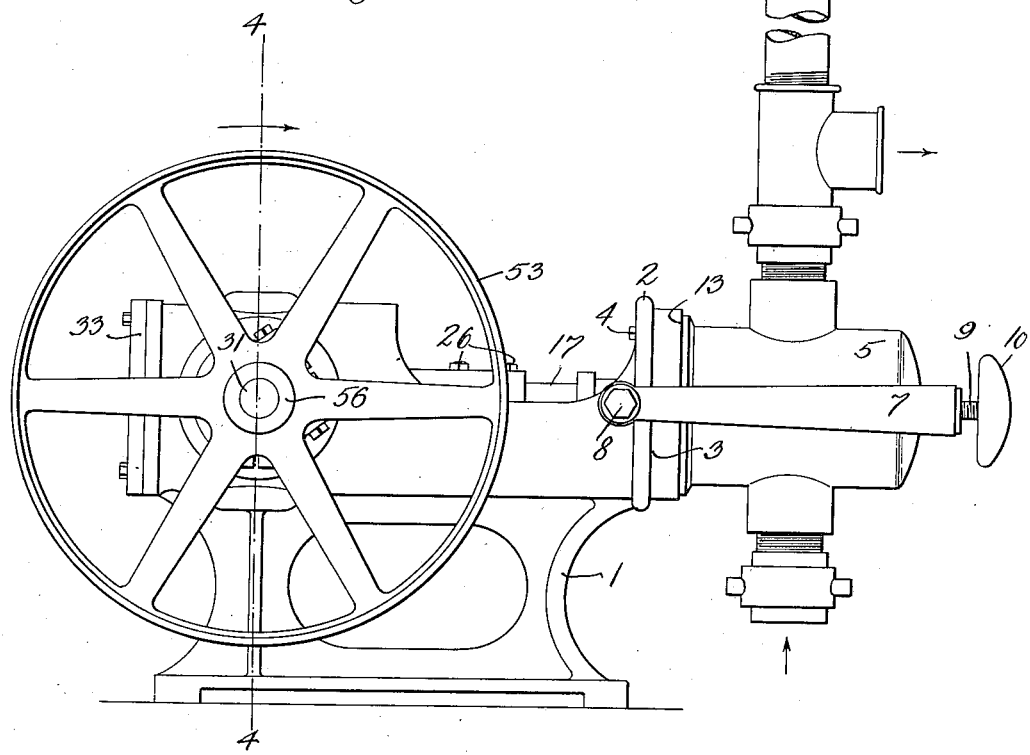
Figure 2:
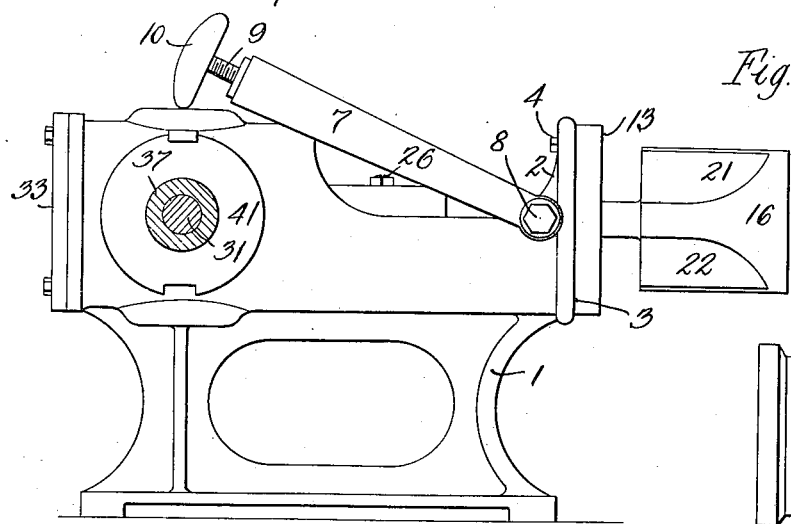
Figure 3:
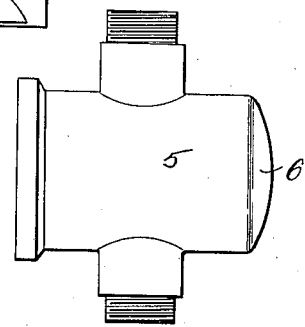

In the accompanying drawings: Figure 1 is a side elevation of a pump embodying one form of the invention. Fig. 2 is a view similar to Fig. 1, the driving pulleys being omitted and the cylinder removed. Fig. 3 is a side elevation of the cylinder detached from the pump. Fig. 4 is a transverse vertical section through the driving end of the pump taken on line 4—4 of Fig. 1. Fig. 5 is a vertical longitudinal section taken on line 5—5 of Fig. 4. Fig. 6 is a diagrammatic view illustrating the movements of the angular crank pin and crank pin slide. Fig. 7 is a fragmentary transverse vertical sectional view through the driving end of the pump, showing the crank shaft rotated through 180° from the position indicated in Fig. 4. Fig. 8 is a sectional plan view. Fig. 9 is a fragmentary vertical sectional view of a portion of the frame, crank shaft bearing and crank, showing the crank shaft bearing inverted prior to removal. Fig. 10 is a section on line 10—10 of Fig. 4. Fig. 11 is a section on line 11—11 of Fig. 9. Figs. 12 and 13 are vertical central transverse sectional views through the cylinder and piston, showing two angular positions of the piston. Fig. 14 is a cross section through the hub of the tight pulley on line 14—14, Fig. 4.

Like reference characters refer to like parts in the several figures.

1 designates the frame of the pump which has a bracket 2 at one end thereof. One head, 3, of the pump cylinder is secured to this bracket in any suitable manner as by means of the screws 4.

5 is the pump cylinder which has a head 6 preferably formed integrally therewith. The cylinder 5 is removably held against the head 3 in any suitable manner, preferably by means of the bail 7 pivoted to the frame 1 by the pivots 8 and carrying a screw 9 provided with a hand wheel 10 by which pressure may be put upon the cylinder to force the same into engagement with the head 3. The joint between the cylinder and the head 3 may be packed in any suitable manner, as by providing a packing 11 in a groove in the end of the cylinder which is adapted to engage a rib 12 formed on the head 3. The head 3 is also preferably provided with an annular flange 13 adapted to receive the end of the cylinder. The cylinder is provided with ports 14 and 15. As shown, the lower port 14 is the intake port, while the upper port 15 is the discharge port. The intake and discharge pipes may be connected to these ports by any suitable detachable connectors so that they may be disconnected to permit the ready removal of the cylinder for cleaning.

16 is the pump piston, which is mounted on a piston rod 17 passing through a stuffing box 18 in the cylinder head 3 and operated by means giving it a reciprocating and partial rotary movement, which will be hereinafter described. The piston 16 is preferably double acting, in which case it is provided with four recesses 19, 20, 21 and 22 of substantially the form shown. Referring particularly to Figs. 5, 8, 12 and 13, it will be seen that the operation of this piston is briefly as follows: The piston being in the position indicated in Fig. 12, is moved away from the cylinder head 6 (and toward the eye), which causes the liquid to be pumped to be drawn into the recess 21 in the piston and into the end of the cylinder adjacent to the head 6, which is in connection with said recess 21, so as to fill the recess and the space between the end of the piston and the cylinder head 6. At the same time, supposing the end of the cylinder between the piston and the head 3 and the recess 19 to have been filled with liquid by a previous operation of the piston, this liquid will be forced out through the port 15 by the movement of the piston toward the head 3. As the piston approaches the head 3 it is partially rotated so as to move the recesses therein relatively to the ports in the cylinder, this rotation continuing as the piston starts back in the direction of the cylinder head 6 until the piston eventually occupies the position shown in Fig. 13. In this position it will be seen that as the piston is moving toward the head 6 (and away from the eye) the liquid drawn into the end of the cylinder adjacent to the head 6 and filling that end of the cylinder and the recesses 21 and 22, will be forced out through the recess 22 and port 15 at the same time milk will be drawn into the recess 20 through the port 14 to fill said recess, the end of the cylinder adjacent to the head 3 and the recess 19. On the next stroke the milk will be again forced out through the recess 19 and port 15 and drawn in through the port 14 and recess 21, and so on. This pump is double acting and no valves whatever are required other than the piston itself and the ports in the cylinder.

It will be seen that the cylinder and piston described, which are the only parts with which the liquid to be pumped comes in contact, are of extreme simplicity of construction and may be taken apart with the greatest ease for the purpose of cleaning and sterilization.

For giving to the piston the described reciprocating and rotary movements, suitable mechanism is provided which is preferably constructed as follows: The piston rod 17 is secured to a cross head 23 which is guided in a suitable guide in the main frame of the pump in such a way as to be capable of reciprocating and limited rotary movement. As shown, the cross head 23 is cylindrical and slides in a cylindrical guide-way 24 in the main frame. The piston rod 17 may be secured to the cross head in any suitable manner, as by being fitted in a socket 25 therein in which it is secured by means of a plurality of set screws 26 engaging the end of the piston rod at different angles.

The cross head 23 has a transverse cylindrical bearing recess 27 in which is mounted a cylindrical crank pin slide 28. The latter is capable of reciprocating and rotary movement in the recess 27 and is provided with a transverse bearing recess 29. The bearing recess 29 receives the angularly disposed end or crank pin 30 of a crank shaft 31, which rotates about an axis at right angles to the axis of the piston rod 17. Rotation of the crank shaft will cause a gyration of the crank pin 30 which will result in transmitting to the cross head 23, piston rod and piston the desired reciprocating and partial rotary movements. This gyratory movement of the crank pin is indicated in Fig. 6, which shows four positions of the crank pin and the corresponding positions of the crank pin slide 28 in dotted lines.

By reason of the described construction of cross head and crank pin slide, it is possible to make the bearing surfaces of the working parts of large area so as to withstand the stresses caused by the angular rotating crank pin, which stresses are constantly varying in direction and amount. Any suitable arrangement for lubricating these surfaces may be provided but this lubrication is effectually accomplished by the structure shown. As illustrated, the cylindrical guide-way for the cross head 23 forms a chamber, one end wall 32 of which is preferably formed integral with the frame of the pump, while the other end wall comprises a removable head 33. This chamber is partly filled with oil, as indicated at 34 in Fig. 5. As the cross head 23 moves directly in this chamber it is obviously thoroughly lubricated by the oil therein. The crank pin slide 28 moving back and forth in its bearing recess in the cross head acts as a plunger of a pump and when on its down stroke, as indicated in Fig. 7, it dips into the oil and forces the same through the oil channels 35 in the slide, thus thoroughly lubricating the bearings between the crank pin and slide and between the slide and cross head. The cylindrical bearing for the cross head is recessed as is indicated at 36, to provide clearance for the crank pin slide in its extreme positions. If the oil level in the chamber 36 should drop so low that the oil cannot overflow into the recess 39 the crank pin slide on its downward stroke will force oil over from the chamber 36 into the recess 39 and keep the latter supplied with oil.

The crank shaft 31 may be supported in any suitable manner but in the construction preferably employed, this shaft is mounted in a bearing sleeve 37 removably fitted in a tubular portion 38 of the pump frame 1. This tubular supporting portion 38 is recessed as indicated at 39, to provide an oil reservoir. The bearing sleeve 37 is secured in the frame in any suitable manner, as by means of the screws 40, as shown in dotted lines in Figs. 4 and 8, which pass through a flange 41 on the bearing sleeve and into the end of the tubular supporting portion of the frame. The sleeve is provided with a chamber 42 having an open bottom 43 through which depends an oil ring 44 riding upon a portion 45 of the crank shaft of reduced diameter. The shaft is tapered at each side of its reduced portion, as indicated at 46, so as to carry the oil deposited upon the shaft by the ring 44 to the shaft journals. The oil carried along the shaft toward the crank pin is discharged into the main chamber in which the cross head reciprocates, while the oil carried along this shaft in the opposite direction is stopped by a groove 47 formed in the shaft and collected in a small chamber 48 from which it is conducted back to the recess 39 through a duct 49. In this way a continuous circulation of oil is provided. The level of the oil 34 in the guide chamber for the cross head is preferably higher than the dividing wall between this chamber and the oil recess 39 so that the oil may flow from one chamber to the other as required. In order that the crank shaft bearing may be removed from its recess in the frame without interference from the oil ring 44, the bearing is so constructed that when inverted it will lift the oil ring to a concentric position so as to permit the ring to move out through the opening in the end of the frame with the shaft bearing. Figs. 4 and 10 show the bearing in its normal position with the oil ring 44 depending into the recess 39 through the open bottom 43 of the chamber 42. Figs. 9 and 11 show the bearing inverted, the oil ring 44 being supported by the top of the chamber 42 and held in concentric position so that it will not interfere with the withdrawal of the crank shaft bearing. In order to make sure that the bearing is properly inverted before being withdrawn, any suitable indicating or interlocking device may be provided. As shown, the flange 41 of the bearing has a notch 50 which is adapted to register with a hook or lug 51 secured to the frame when the bearing is in position to be removed. When the bearing has been inverted so as to permit the oil ring to depend through the open bottom 43 of the chamber 42, the notch 50 is moved away from the hook 51 and the latter overhangs the periphery of the flange 41 so that removal of the bearing is impossible.

The crank shaft is prevented from longitudinal movement in its bearing in any suitable manner. It is preferably provided at its inner end with a collar 52 engaging the inner end of the bearing, while on its outer end are mounted means for imparting motion to it from any suitable source of power, such as the tight and loose pulleys 53 and 533 respectively. The tight pulley 53 engages the outer end of the shaft bearing and so prevents movement of the shaft in the inward direction. The pulleys may be held upon the shaft by any suitable means. As shown in Fig. 14, the hub of the tight pulley 53 is split and clamped upon the shaft by a screw bolt 54 and the pulley is interlocked with the shaft by a key 55. A removable collar 56 is secured upon the end of the shaft. By adjusting the tight pulley longitudinally on the shaft, any endwise play of the latter may be taken up. Obviously the shaft may be driven in any other desired manner.

Suitable drainage cocks may be provided, such as 57, for draining the oil from the guide chamber for the cross head, and 58, for draining oil or milk which may accidentally collect in the space between the cross head, guide chamber and the pump cylinder.

From the foregoing description it will be seen that a pump is provided which is of simple construction and can be very easily taken apart for cleaning and in which the working parts have large bearing surfaces thoroughly lubricated so that great durability is secured. The driving mechanism for the pump is of great simplicity and gives the necessary reciprocating and rotary movements to the pump piston. It is particularly well adapted to drive the piston at a comparatively high speed and with a short stroke, which results in the smooth and steady operation of the pump and uniform flow of the liquid. A short stroke is also particularly desirable as it permits the cylinder and one head to be readily formed as an integral structure and facilitates the removal and cleaning of the interior of the cylinder. The short stroke resulting in a steady flow through the delivery line substantially eliminates vibration of the latter, which is objectionable particularly when the pump is utilized for circulating the liquid through tubular pasteurizers or other like apparatus.

I claim as my invention:

1. The combination of a pump frame, a cylinder mounted on said frame, a guideway on said frame, a piston mounted in said cylinder, a cross head reciprocably and rotatably mounted in said guide-way, connections between said cross head and piston, a crank pin slide mounted in said cross head to reciprocate in a direction transverse to the direction of reciprocation of said cross head, a crank shaft rotatable about an axis transverse to the direction of reciprocation of said cross head, and an angularly disposed crank pin carried by said crank shaft and journaled in a bearing recess in said crank pin slide.

2. The combination of a pump frame, a cylinder mounted on said frame, a piston reciprocably and rotatably mounted in said cylinder, said piston having parts acting as inlet and discharge valves when the piston is rotated, said frame having a cylindrical guide recess therein alined with said cylinder, a cross head reciprocably and rotatably mounted in said recess, connections between said cross head and piston, said cross head having a cylindrical bearing recess therein, the axis of which is transverse to the axis of said cylindrical guide recess in the frame, a cylindrical crank pin slide mounted in said bearing recess, a crank shaft mounted in said frame and rotatable about an axis transverse to the axis of said guide recess, and a crank pin carried by said shaft and inclined to the axis of rotation of said shaft, said crank pin being journaled in a recess in said crank pin slide.

3. The combination of a support having a guideway, a cross head mounted in said guideway and capable of reciprocatory and limited rotary movement, said cross head having a cylindrical bearing recess, a cylindrical crank pin slide mounted in said bearing recess and having limited rotary movement and reciprocatory movement in a direction at right angles to the direction of the reciprocatory movement of said cross head, said crank pin slide having a bearing recess whose axis is perpendicular to the axis of reciprocatory movement thereof, a crank shaft rotatable about an axis perpendicular to the axis of reciprocatory movement of said cross head, and a crank pin carried by said crank shaft and disposed at an angle to the axis of rotation thereof, said crank pin being rotatably mounted in the bearing recess in said crank pin slide.

4. The combination of a frame having a guideway, a cross head mounted in said guideway to have reciprocatory and limited rotary movement, a crank pin slide mounted in said cross head, a crank shaft having an angularly disposed crank pin engaging said slide, and a bearing for said crank shaft comprising a sleeve removably mounted in a recess in said frame.

5. The combination of a frame having a guideway, a cross head mounted in said guideway to have reciprocatory and limited rotary movement, a crank pin slide mounted in said cross head, a crank shaft having an angularly disposed crank pin engaging said slide, a bearing for said crank shaft, an oil holding recess arranged in said frame below said shaft and bearing, and an oil reservoir arranged in said frame below said crank pin and slide.

6. The combination of a frame having a guide way, a cross head mounted in said guide way to have reciprocatory and limited rotary movement, a crank pin slide mounted in said cross head, a crank shaft having an angularly disposed crank pin engaging said slide, a bearing for said crank shaft, a driving device having a split hub, means for clamping said hub on said shaft, and a key interlocking said hub with said shaft.

7. The combination of a frame having a guideway, a cross head mounted in said guideway to have reciprocatory and limited rotary movement, a crank pin slide mounted in said cross head, a crank shaft having an angularly disposed crank pin engaging said slide, a bearing for said crank shaft comprising a sleeve removably mounted in a recess in said frame, a chamber in said sleeve, and an oil ring on said shaft within said chamber.

8. The combination of a frame having a cylindrical chamber therein forming a guideway and having a tubular supporting portion projecting at one side of said chamber, said tubular portion having a recess, the lower portions of said chamber and recess forming oil reservoirs, a cross head mounted in said chamber and having reciprocatory and limited rotary movement, said cross head having a bearing recess, a crank pin slide mounted in said bearing recess and capable of limited rotary and reciprocatory movements in said recess, said crank pin slide having a transverse bearing recess, a crank shaft bearing removably mounted in the tubular supporting portion of said frame, a chamber formed in said bearing having an open bottom, a crank shaft journaled in said bearing carrying an angularly disposed crank pin which is journaled in the bearing recess in said crank pin slide, and an oil ring mounted on said crank shaft in the chamber in said crank shaft bearing and depending through the open bottom of said chamber into the oil reservoir in said tubular portion of the frame.

9. The combination of a frame having a cylindrical chamber forming a guideway and having a tubular supporting portion projecting at one side of said chamber, said tubular portion having a recess, the lower portions of said chamber and recess forming oil reservoirs, a cross head mounted in said chamber and having reciprocatory and rotary movements therein, said cross head having a bearing recess, a crank pin slide mounted in said bearing recess and capable of limited rotary and reciprocatory movements in said recess, said crank pin slide having a transverse bearing recess, a crank shaft bearing removably mounted in the tubular supporting portion of said frame, a chamber formed in said bearing having an open bottom, a crank shaft journaled in said bearing carrying an angularly disposed crank pin which is journaled in the bearing recess in said crank pin slide, an oil ring mounted on said crank shaft in the chamber in said crank shaft bearing and depending through the open bottom of said chamber into the oil reservoir in said tubular portion of the frame, said crank shaft bearing being rotatable in said tubular portion of the frame so as to center said oil ring in the chamber in said bearing to permit said bearing to be removed from said tubular portion, and means to insure the inversion of said crank shaft bearing before its attempted removal from the frame.

Witness my hand, this 27th day of June, 1913.

CHARLES BROWN DALZELL.

Witnesses:
LOOMIS BURRELL,
W. T. WOLFENDEN.